United States Patent
Welk et al.

(10) Patent No.: US 6,779,889 B2
(45) Date of Patent: Aug. 24, 2004

(54) PROGRESSIVE SPECTACLE LENS EXHIBITING ONLY SLIGHT DYNAMIC CHANGE OF THE PROPERTIES OF USE DURING A HORIZONTAL VIEWING MOVEMENTS

(75) Inventors: Andrea Welk, Munich (DE); Peter Baumbach, Munich (DE); Walter Haimerl, Munich (DE); Herbert Pfeiffer, Munich (DE); Gregor Esser, Munich (DE); Helmut Altheimer, Lauchdorf (DE); Rainer Dorsch, Munich (DE); Martin Zimmerman, Kleinberghofen (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 10/258,818
(22) PCT Filed: Apr. 27, 2001
(86) PCT No.: PCT/DE01/01593
§ 371 (c)(1), (2), (4) Date: Mar. 28, 2003
(87) PCT Pub. No.: WO01/81986
PCT Pub. Date: Nov. 1, 2001

(65) Prior Publication Data
US 2003/0202154 A1 Oct. 30, 2003

(30) Foreign Application Priority Data
Apr. 27, 2000 (DE) .......... 100 20 718

(51) Int. Cl.$^7$ .......... G02C 7/06
(52) U.S. Cl. .......... 351/169
(58) Field of Search .......... 351/169, 168, 351/170–172, 177

(56) References Cited

U.S. PATENT DOCUMENTS

| | | | | |
|---|---|---|---|---|
| 5,327,181 A | * | 7/1994 | Waido | 351/169 |
| 5,444,503 A | | 8/1995 | Kelch et al. | 351/169 |
| 5,864,380 A | * | 1/1999 | Umeda | 351/169 |
| 5,949,519 A | | 9/1999 | Le Saux et al. | 351/169 |
| 6,655,803 B1 | * | 12/2003 | Rubinstein et al. | 351/177 |

* cited by examiner

Primary Examiner—Jordan M. Schwartz
(74) Attorney, Agent, or Firm—Crowell & Moring LLP

(57) ABSTRACT

A spectacle lens comprises a region (distance portion) designed for viewing at greater distances, in particular, to infinity; a region (near portion) designed for viewing at short distances and, in particular, "reading distances"; and a progression zone located between the distance portion and the near portion, in which the power of the spectacle lens increases from a value at the distance reference point located in the distance portion to the value at the near reference point located in the near portion along a line (principal meridian) curving towards the nose. It is one of the characteristics of the invention that for minimizing the change of imaging properties with horizontal movements of the gaze along a curve described by the points of penetration of the principal rays through the front surface, these principal rays passing through a point having the coordinates (x−dx, y, s) at the beginning of the movement and a point having the coordinates (x +dx, y, s) at the end of the movement, at s=−40 mm and dx=10 mm particular conditions apply.

7 Claims, 1 Drawing Sheet

PROGRESSIVE SPECTACLE LENS EXHIBITING ONLY SLIGHT DYNAMIC CHANGE OF THE PROPERTIES OF USE DURING A HORIZONTAL VIEWING MOVEMENTS

FIELD OF THE INVENTION

The invention relates to a progressive spectacle lens, the lens including an only slight dynamic change of the as worn properties during horizontal movements of glance.

BACKGROUND OF THE INVENTION

Progressive spectacle lenses (also called varifocal lenses, multifocal lenses etc.) are usually understood to be spectacle lenses having a different (smaller) power in the region through which a spectacle wearer views an object located at a greater distance—hereunder designated as distance portion—than in the region (near portion) through which the spectacle wearer views a near object. Located between the distance portion and the near portion is the so-called progressive zone in which the power of the spectacle lens continuously increases from that of the distance portion to that of the near portion. The magnitude of the power increase is also designated as the power addition.

As a rule, the distance portion is located in the upper part of the spectacle lens and designed for viewing "to infinity", whilst the near portion is located in the lower region and is particularly designed for reading. With spectacles for special applications—those for pilots or for monitor work stations are mentioned as examples—the distance and near portions also may be arranged differently and/or designed for other distances. Furthermore, it is possible for a plurality of near portions and/or distance portions and corresponding progression zones to be present.

With progressive spectacle lenses having a constant refractive index it is necessary for the curvature of one or both surfaces to change continuously from the distance portion to the near portion, in order that the power may increase between the distance portion and the near portion The surfaces of spectacle lenses are usually characterized by the so-called principal radii of curvature R1 and R2 at every point of the surface. (Sometimes also the principal curvatures K1=1/R1 and K2=1/R2 are stated instead of the principal radii of curvature). Together with the refractive index n of the glass material, the principal radii of curvature determine the parameters frequently used for an ophthalmologic characterization of a surface:

Surface power $D=0.5 \cdot (n-1) \cdot (1/R1+1/R2)$

Surface astigmatism $A=(n-1) \cdot (1/R1-1/R2)$.

The surface power is the parameter with which an increase of the power from the distance portion to the near portion is achieved. The surface astigmatism (lucidly termed cylinder power) is a "disturbing property", because an astigmatism—inasmuch as an eye does not have an innate astigmatism to be corrected—exceeding a value of about 0.5 dpt results in an indistinct image on the retina being perceived.

Although any change of the curvature of the surface which is needed for achieving a surface power increase without vision being "disturbed" by surface astigmatism can be attained relatively simply along a (plane or curved) meridian, considerable "intersections" of surfaces will result alongside this meridian, leading to a large surface astigmatism which more or less impairs the lens in regions alongside the mentioned meridian.

A further consequence of these intersections is that the spectacle lens will have different nasal and temporal properties at corresponding see-through positions. Hereby binocular vision, in particular, may be adversely affected.

This becomes apparent mainly during movements of the glance and is thus disturbing:

When a spectacle wearer allows his gaze to pursue a moving object whilst keeping his head at rest, his visual impression will depend, on the one hand, on the imaging quality of the two single lenses of his spectacles at the positions through which he looks whilst making the necessary eye movements, to follow the object. When the spectacle wearer encounters small image defects (astigmatism, refraction defects, etc.) at these see-through positions, he will see the object more distinctly than when large image defects are present.

On the other hand, however, as a rule both eyes participate in seeing, and the total visual impression will be composed of the visual impressions of both eyes.

Thus, it will be of consequence, for example, whether the object can be seen binocularly as being single, how large the effort of fusion is, and whether the spectacle wearer perceives the object equally distinctly with both eyes, or well with one eye and badly with the other eye.

Finally, in the case of moving objects any change of this binocular visual impression during the pursuit of the object is of importance.

The invention is based on an object of further developing a progressive spectacle lens in such manner that the optical parameters relevant to the quality of the image change as little as possible whilst the glance is shifting.

This object is achieved by the invention as described and claimed hereinafter. Further developments of the invention are the subject matter of the dependent claims.

As a rule, spectacle lenses are assessed and described by means of two-dimensional isometric-line representations (plots) of certain properties of the surfaces or the wearing situation. The parameters of interest for the wearing position are obtained, for example, by first establishing the principal ray passing through the point on the spectacle lens and the center of rotation of the eye, and subsequently calculating a wave-front along the principal ray, the properties of which are finally plotted.

With this, the properties peculiar to the local wave-front are obtained for every angle of view.

It is not possible simply to determine from these plots the performance of a spectacle lens during, for example, horizontal movements of the gaze, because the succession of the points of penetration by the principal rays through the spectacle lens caused by the movement is not known.

It would appear obvious to simply read-off the values of a horizontal meridian from the plot, but this is wrong when the vertical prism changes along this meridian, and this is almost always the case.

A typical situation is that of a spectacle wearer being presented with a horizontally moving object point on which his gaze is to be fixed whilst he keeps his head unmoving. Such horizontal movements of gaze frequently occur, for example during reading or when working on a computer. During these movements of the eye the spectacle wearer's visual impression of the viewed object point will change, because the glance will travel through regions of the lens which have different imaging qualities. The as worn parameters, in particular the surface power and the astigmatism will change.

BRIEF DESCRIPTION OF THE DRAWINGS

In the following, the invention will be described by way of example, without limitation of the general inventive concept, with the aid of embodiments with reference to the drawings to which attention is expressly drawn concerning the disclosure of all details of the invention not described more explicitly in the text.

DESCRIPTION OF PREFERRED EMBODIMENTS

Figure 1:
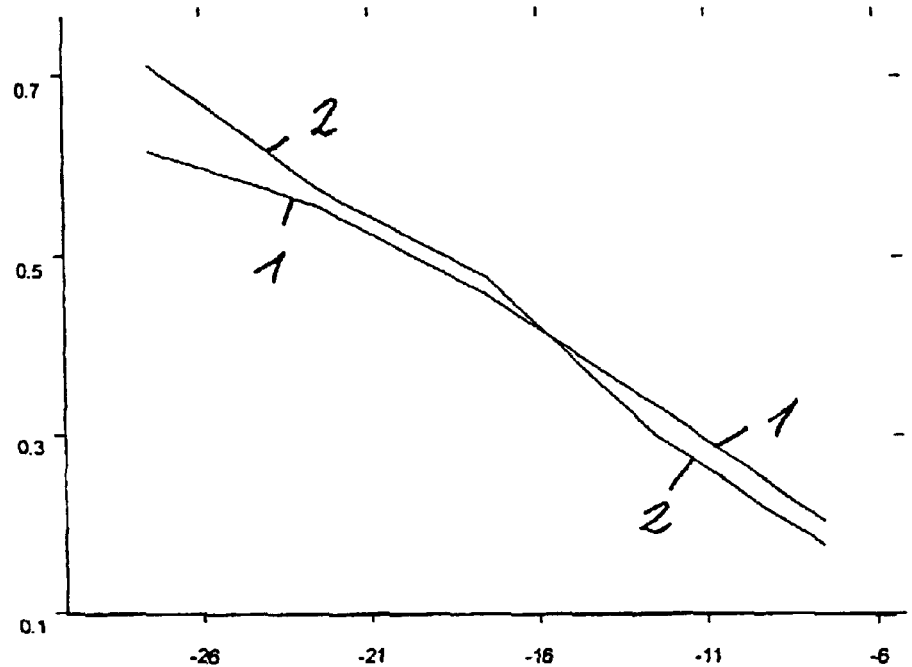
FIG. 1 shows the variation of the astigmatism in dependence upon the x coordinate.
Figure 2:
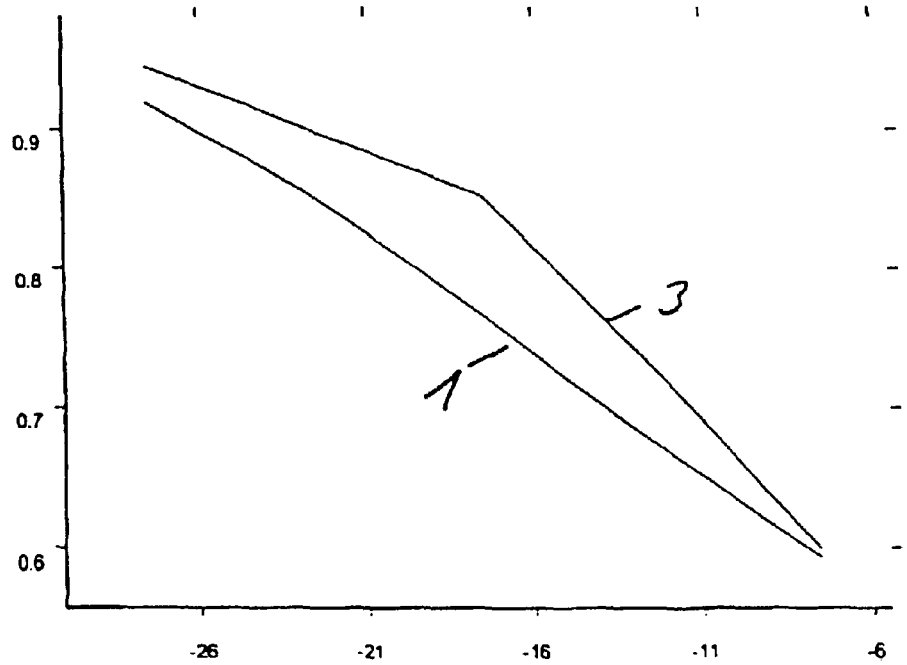
FIG. 2 shows the variation of the mean surface power in dependence upon the x coordinate.

FIGS. 1 and 2 show as a comparison of imaging properties, the change of astigmatism and surface power with horizontal movement of the glance for various commercially available right-side lenses having the prescription

| spherical power | sph | +0.5 dpt, |
| --- | --- | --- |
| astigmatic power | cyl | 0 dpt |
| power addition | add | 2.0 dpt |
| prism | pr | 0 cm/m | compared with that of a spectacle lens of the present invention.

The spectacle lens of the present invention is designated by 1, a specta cle lens "CZ GRADAL Top" is designated by 2, and a spectacle lens "Essilor Varilux Comfort" is designated by 3.

As an example, the case was chosen in which the central principal ray passes through the point having the coordinates P (x=−15 mm, y=15 mm, z=−40 mm). The coordinate system used has its origin at the front-side vertex of the spectacle lens, and the z axis extends in the direction of the light.

The object point is moved horizontally by a total of 20 mm, i.e. from the coordinate x=−27.5 mm to x=−7.5 mm. On the spectacle lens this corresponds to x coordinates of about −12 mm to −3 mm at a height of about y=7 mm.

In the case of the subject matter of the present invention, a smaller change of the imaging properties whilst the glance pursues the horizontally moved object is clearly evident.

With the spectacle lens of the present invention, the imaging properties such as surface power and astigmatism change distinctly less during the movement of the glance. This fact is expressed by the numerical values of the so-called lift, i.e. the difference between maximum and minimum value of the observed properties, and of the maximum change, i.e. the maximum value of the first differential coefficient of the observed properties along the path described by the points of penetration of the principal ray through the front surface.

It is thus a characteristic of the progressive spectacle lens of the present invention that the change of the imaging properties with horizontal movements of the glance and the irritations correlated therewith are as small as possible.

This is achieved in that for minimizing a change of imaging properties with horizontal movements of the gaze along a curve described by the points of penetration of the principal rays through the front surface, these principal rays passing through a point having the coordinates (x−dx, y, s) at the beginning of the movement and a point having the coordinates (x+dx, y, s) at the end of the movement, at s=−40 mm and dx=10 mm the absolute value of the difference between the minimum and maximum astigmatism occurring along the curve is smaller than the value AH given in the following as an example for various values of the spherical power and the power addition:

| Sph = −4.0 dpt, add = 1.0 dpt | | |
| --- | --- | --- |
| y = 15 mm | | |
| x [mm] | −15.0 | 15.0 |
| AH [dpt] | 0.172 | 0.106 |
| y = −35 mm | | |
| x [mm] | −15.0 | 15.0 |
| AH [dpt] | 0.527 | 0.567 |
| Sph = −4.0 dpt, add = 2.0 dpt | | |
| y = 15 mm | | |
| x [mm] | −15.0 | 15.0 |
| AH [dpt] | 0.401 | 0.341 |
| y = −35 mm | | |
| x [mm] | −15.0 | 15.0 |
| AH [dpt] | 0.998 | 1.202 |
| Sph = −4.0 dpt, add = 3.0 dpt | | |
| y = 15 mm | | |
| x [mm] | −15.0 | 15.0 |
| AH [dpt] | 0.490 | 0.384 |
| y = −35 mm | | |
| x [mm] | −15.0 | 15.0 |
| AH [dpt] | 1.617 | 2.003 |
| Sph = 0.5 dpt, add = 1.0 dpt | | |
| y = 15 mm | | |
| x [mm] | −15.0 | 15.0 |
| AH [dpt] | 0.197 | 0.130 |
| y = −35 mm | | |
| x [mm] | −15.0 | 15.0 |
| AH [dpt] | 0.667 | 0.727 |
| Sph = 0.5 dpt, add = 2.0 dpt | | |
| y = 15 mm | | |
| x [mm] | −15.0 | 15.0 |
| AH [dpt] | 0.413 | 0.353 |
| y = −35 mm | | |
| x [mm] | −15.0 | 15.0 |
| AH [dpt] | 1.074 | 1.194 |
| Sph = 0.5 dpt, add = 3.0 dpt | | |
| y = 15 mm | | |
| x [mm] | −15.0 | 15.0 |
| AH [dpt] | 0.523 | 0.390 |
| y = −35 mm | | |
| x [mm] | −15.0 | 15.0 |
| AH [dpt] | 1.708 | 2.030 |
| Sph = 5.0 dpt, add = 1.0 dpt | | |
| y = 15 mm | | |
| x [mm] | −15.0 | 15.0 |
| AH [dpt] | 0.205 | 0.135 |
| y = −35 mm | | |
| x [mm] | −15.0 | 15.0 |
| AH [dpt] | 0.719 | 0.732 |
| Sph = 5.0 dpt, add = 2.0 dpt | | |
| y = 15 mm | | |
| x [mm] | −15.0 | 15.0 |
| AH [dpt] | 0.411 | 0.333 |
| y = −35 mm | | |
| x [mm] | −15.0 | 15.0 |
| AH [dpt] | 1.192 | 1.330 |
| Sph = 5.0 dpt, add = 3.0 dpt | | |
| y = 15 mm | | |
| x [mm] | −15.0 | 15.0 |
| AH [dpt] | 0.627 | 0.383 |
| y = −35 mm | | |
| x [mm] | −15.0 | 15.0 |
| AH [dpt] | 1.772 | 2.271 |

It is furthermore preferred that the absolute value of the difference between the minimum and the maximum mean surface power occurring on the curve be smaller than the value BH given in the following as an example for various values of the spherical power and the power addition:

| | | |
|---|---|---|
| Sph = −4.0 dpt, add = 1.0 dpt | | |
| y = 15 mm | | |
| x [mm] | −15.0 | 15.0 |
| BH [dpt] | 0.116 | 0.068 |
| y = −35 mm | | |
| x [mm] | −15.0 | 15.0 |
| BH [dpt] | 0.334 | 0.409 |
| Sph = −4.0 dpt, add = 2.0 dpt | | |
| y = 15 mm | | |
| x [mm] | −15.0 | 15.0 |
| BH [dpt] | 0.259 | 0.209 |
| y = −35 mm | | |
| x [mm] | −15.0 | 15.0 |
| BH [dpt] | 0.687 | 0.890 |
| Sph = −4.0 dpt, add = 3.0 dpt | | |
| y = 15 mm | | |
| x [mm] | −15.0 | 15.0 |
| BH [dpt] | 0.347 | 0.235 |
| y = −35 mm | | |
| x [mm] | −15.0 | 15.0 |
| BH [dpt] | 0.957 | 1.351 |
| Sph = 0.5 dpt, add = 1.0 dpt | | |
| y = 15 mm | | |
| x [mm] | −15.0 | 15.0 |
| BH [dpt] | 0.155 | 0.093 |
| y = −35 mm | | |
| x [mm] | −15.0 | 15.0 |
| BH [dpt] | 0.384 | 0.504 |
| Sph = 0.5 dpt, add = 2.0 dpt | | |
| y = 15 mm | | |
| x [mm] | −15.0 | 15.0 |
| BH [dpt] | 0.326 | 0.248 |
| y = −35 mm | | |
| x [mm] | −15.0 | 15.0 |
| BH [dpt] | 0.750 | 0.931 |
| Sph = 0.5 dpt, add = 3.0 dpt | | |
| y = 15 mm | | |
| x [mm] | −15.0 | 15.0 |
| BH [dpt] | 0.427 | 0.279 |
| y = −35 mm | | |
| x [mm] | −15.0 | 15.0 |
| BH [dpt] | 1.081 | 1.362 |
| Sph = 5.0 dpt, add = 1.0 dpt | | |
| y = 15 mm | | |
| x [mm] | −15.0 | 15.0 |
| BH [dpt] | 0.101 | 0.063 |
| y = −35 mm | | |
| x [mm] | −15.0 | 15.0 |
| BH [dpt] | 0.585 | 0.676 |
| Sph = 5.0 dpt, add = 2.0 dpt | | |
| y = 15 mm | | |
| x [mm] | −15.0 | 15.0 |
| BH [dpt] | 0.286 | 0.218 |
| y = −35 mm | | |
| x [mm] | −15.0 | 15.0 |
| BH [dpt] | 0.981 | 1.197 |
| Sph = 5.0 dpt, add = 3.0 dpt | | |
| y = 15 mm | | |
| x [mm] | −15.0 | 15.0 |
| BH [dpt] | 0.447 | 0.257 |
| y = −35 mm | | |
| x [mm] | −15.0 | 15.0 |
| BH [dpt] | 1.164 | 1.674 |

In a further preferred example of embodiment the absolute value of the maximum of the first derivative of the astigmatism is smaller along the curve than the value AG given in the following:

| | | |
|---|---|---|
| Sph = −4.0 dpt, add = 1.0 dpt | | |
| y = 15 mm | | |
| x [mm] | −15.0 | 15.0 |
| AG [dpt/mm] | 0.027 | 0.021 |
| y = −35 mm | | |
| x [mm] | −15.0 | 15.0 |
| AG [dpt/mm] | 0.091 | 0.088 |
| Sph = −4.0 dpt, add = 2.0 dpt | | |
| y = 15 mm | | |
| x [mm] | −15.0 | 15.0 |
| AG [dpt/mm] | 0.065 | 0.054 |
| y = −35 mm | | |
| x [mm] | −15.0 | 15.0 |
| AG [dpt] | 0.168 | 0.179 |
| Sph = −4.0 dpt, add = 3.0 dpt | | |
| y = 15 mm | | |
| x [mm] | −15.0 | 15.0 |
| AG [dpt/mm] | 0.077 | 0.060 |
| y = −35 mm | | |
| x [mm] | −15.0 | 15.0 |
| AG [dpt/mm] | 0.276 | 0.284 |
| Sph = 0.5 dpt, add = 1.0 dpt | | |
| y = 15 mm | | |
| x [mm] | −15.0 | 15.0 |
| AG [dpt/mm] | 0.027 | 0.021 |
| y = −35 mm | | |
| x [mm] | −15.0 | 15.0 |
| AG [dpt/mm] | 0.105 | 0.105 |
| Sph = 0.5 dpt, add = 2.0 dpt | | |
| y = 15 mm | | |
| x [mm] | −15.0 | 15.0 |
| AG [dpt/mm] | 0.060 | 0.049 |
| y = −35 mm | | |
| x [mm] | −15.0 | 15.0 |
| AG [dpt/mm] | 0.168 | 0.151 |
| Sph = 0.5 dpt, add = 3.0 dpt | | |
| y = 15 mm | | |
| x [mm] | −15.0 | 15.0 |
| AG [dpt/mm] | 0.079 | 0.053 |
| y = −35 mm | | |
| x [mm] | −15.0 | 15.0 |
| AG [dpt/mm] | 0.285 | 0.256 |
| Sph = 5.0 dpt, add = 1.0 dpt | | |
| y = 15 mm | | |
| x [mm] | −15.0 | 15.0 |
| AG [dpt/mm] | 0.027 | 0.017 |
| y = −35 mm | | |
| x [mm] | −15.0 | 15.0 |
| AG [dpt/mm] | 0.093 | 0.094 |
| Sph = 5.0 dpt, add = 2.0 dpt | | |
| y = 15 mm | | |
| x [mm] | −15.0 | 15.0 |
| AG [dpt/mm] | 0.052 | 0.040 |
| y = −35 mm | | |
| x [mm] | −15.0 | 15.0 |
| AG [dpt/mm] | 0.183 | 0.155 |
| Sph = 5.0 dpt, add = 3.0 dpt | | |
| y = 15 mm | | |
| x [mm] | −15.0 | 15.0 |
| AG [dpt/mm] | 0.075 | 0.043 |
| y = −35 mm | | |
| x [mm] | −15.0 | 15.0 |
| AG [dpt/mm] | 0.284 | 0.252 |

In particular, the absolute value of the maximum of the first derivative of the mean power along the curve may be smaller than the value BG:

| Sph = −4.0 dpt, add = 1.0 dpt | | |
|---|---|---|
| y = 15 mm | | |
| x [mm] | −15.0 | 15.0 |
| BG [dpt/mm] | 0.021 | 0.014 |
| y = −35 mm | | |
| x [mm] | −15.0 | 15.0 |
| BG [dpt/mm] | 0.066 | 0.065 |
| Sph = −4.0 dpt, add = 2.0 dpt | | |
| y = 15 mm | | |
| x [mm] | −15.0 | 15.0 |
| BG [dpt/mm] | 0.037 | 0.029 |
| y = −35 mm | | |
| x [mm] | −15.0 | 15.0 |
| BG [dpt/mm] | 0.129 | 0.153 |
| Sph = −4.0 dpt, add = 3.0 dpt | | |
| y = 15 mm | | |
| x [mm] | −15.0 | 15.0 |
| BG [dpt/mm] | 0.051 | 0.032 |
| y = −35 mm | | |
| x [mm] | −15.0 | 15.0 |
| BG [dpt/mm] | 0.187 | 0.223 |
| Sph = 0.5 dpt, add = 1.0 dpt | | |
| y = 15 mm | | |
| x [mm] | −15.0 | 15.0 |
| BG [dpt/mm] | 0.021 | 0.016 |
| y = −35 mm | | |
| x [mm] | −15.0 | 15.0 |
| BG [dpt/mm] | 0.072 | 0.073 |
| Sph = 0.5 dpt, add = 2.0 dpt | | |
| y = 15 mm | | |
| x [mm] | −15.0 | 15.0 |
| BG [dpt/mm] | 0.042 | 0.034 |
| y = −35 mm | | |
| x [mm] | −15.0 | 15.0 |
| BG [dpt/mm] | 0.137 | 0.131 |
| Sph = 0.5 dpt, add = 3.0 dpt | | |
| y = 15 mm | | |
| x [mm] | −15.0 | 15.0 |
| BG [dpt/mm] | 0.058 | 0.036 |
| y = −35 mm | | |
| x [mm] | −15.0 | 15.0 |
| BG [dpt/mm] | 0.208 | 0.177 |
| Sph = 5.0 dpt, add = 1.0 dpt | | |
| y = 15 mm | | |
| x [mm] | −15.0 | 15.0 |
| BG [dpt/mm] | 0.012 | 0.008 |
| y = −35 mm | | |
| x [mm] | −15.0 | 15.0 |
| BG [dpt/mm] | 0.085 | 0.084 |
| Sph = 5.0 dpt, add = 2.0 dpt | | |
| y = 15 mm | | |
| x [mm] | −15.0 | 15.0 |
| BG [dpt/mm] | 0.034 | 0.025 |
| y = −35 mm | | |
| x [mm] | −15.0 | 15.0 |
| BG [dpt/mm] | 0.176 | 0.154 |
| Sph = 5.0 dpt, add = 3.0 dpt | | |
| y = 15 mm | | |
| x [mm] | −15.0 | 15.0 |
| BG [dpt/mm] | 0.052 | 0.027 |
| y = −35 mm | | |
| x [mm] | −15.0 | 15.0 |
| BG [dpt/mm] | 0.228 | 0.194 |

In this, intermediate or extrapolated values apply to prescriptions not indicated.

What is claimed is:

1. Spectacle lens comprising
   a distance region designed for viewing at greater distances including infinity;
   a near region designed for viewing at shorter distances including reading distances; and
   a progression zone disposed between the distance portion and the near portion, in which a power of the spectacle lens increases from a value in a distance reference point located in the distance region to a value at a near reference point located in the near portion along a principal meridian line curving towards a nose;
   wherein for minimizing a change of imaging properties with horizontal movements of a gaze along a curve described by points of penetration of principal rays through a front surface, these principal rays passing though a point having the coordinates (x−dx, y, s) at the beginning of a movement and a point having the coordinates (x+dx, y, s) at the end of the movement, at s=−40 mm and dx=10 mm an absolute value of a difference between a minimum and a maximum astigmatism occurring along the curve is smaller than AH, which is a function of lens parameters x, y, Sph, and add, wherein the function is obtained by interpolating and extrapolating the values provided in the tables below:

| Sph = −4.0 dpt, add = 1.0 dpt | | |
|---|---|---|
| y = 15 mm | | |
| x [mm] | −15.0 | 15.0 |
| AH [dpt] | 0.172 | 0.106 |
| y = −35 mm | | |
| x [mm] | −15.0 | 15.0 |
| AH [dpt] | 0.527 | 0.567 |
| Sph = −4.0 dpt, add = 2.0 dpt | | |
| y = 15 mm | | |
| x [mm] | −15.0 | 15.0 |
| AH [dpt] | 0.401 | 0.341 |
| y = −35 mm | | |
| x [mm] | −15.0 | 15.0 |
| AH [dpt] | 0.998 | 1.202 |
| Sph = −4.0 dpt, add = 3.0 dpt | | |
| y = 15 mm | | |
| x [mm] | −15.0 | 15.0 |
| AH [dpt] | 0.490 | 0.384 |
| y = −35 mm | | |
| x [mm] | −15.0 | 15.0 |
| AH [dpt] | 1.617 | 2.003 |
| Sph = 0.5 dpt, add = 1.0 dpt | | |
| y = 15 mm | | |
| x [mm] | −15.0 | 15.0 |
| AH [dpt] | 0.197 | 0.130 |
| y = −35 mm | | |
| x [mm] | −15.0 | 15.0 |
| AH [dpt] | 0.667 | 0.727 |
| Sph = 0.5 dpt, add = 2.0 dpt | | |
| y = 15 mm | | |
| x [mm] | −15.0 | 15.0 |
| AH [dpt] | 0.413 | 0.353 |
| y = −35 mm | | |
| x [mm] | −15.0 | 15.0 |
| AH [dpt] | 1.074 | 1.194 |
| Sph = 0.5 dpt, add = 3.0 dpt | | |
| y = 15 mm | | |
| x [mm] | −15.0 | 15.0 |
| AH [dpt] | 0.523 | 0.390 |
| y = −35 mm | | |
| x [mm] | −15.0 | 15.0 |
| AH [dpt] | 1.708 | 2.030 |

-continued

| Sph = 5.0 dpt, add = 1.0 dpt | | |
|---|---|---|
| y = 15 mm | | |
| x [mm] | −15.0 | 15.0 |
| AH [dpt] | 0.205 | 0.135 |
| y = −35 mm | | |
| x [mm] | −15.0 | 15.0 |
| AH [dpt] | 0.719 | 0.732 |
| Sph = 5.0 dpt, add = 2.0 dpt | | |
| y = 15 mm | | |
| x [mm] | −15.0 | 15.0 |
| AH [dpt] | 0.411 | 0.333 |
| y = −35 mm | | |
| x [mm] | −15.0 | 15.0 |
| AH [dpt] | 1.192 | 1.330 |
| Sph = 5.0 dpt, add = 3.0 dpt | | |
| y = 15 mm | | |
| x [mm] | −15.0 | 15.0 |
| AH [dpt] | 0.627 | 0.383 |
| y = −35 mm | | |
| x [mm] | −15.0 | 15.0 |
| AH [dpt] | 1.772 | 2.271. |

2. Spectacle lens according to claim 1, wherein an absolute value of a difference between a minimum and a maximum mean surface power occurring along the curve is smaller than BH, which is a function of lens parameters x, y, Sph, and add, wherein the function is obtained by interpolating and extrapolating the values provided in the tables below

| Sph = −4.0 dpt, add = 1.0 dpt | | |
|---|---|---|
| y = 15 mm | | |
| x [mm] | −15.0 | 15.0 |
| BH [dpt] | 0.116 | 0.068 |
| y = −35 mm | | |
| x [mm] | −15.0 | 15.0 |
| BH [dpt] | 0.334 | 0.409 |
| Sph = −4.0 dpt, add = 2.0 dpt | | |
| y = 15 mm | | |
| x [mm] | −15.0 | 15.0 |
| BH [dpt] | 0.259 | 0.209 |
| y = −35 mm | | |
| x [mm] | −15.0 | 15.0 |
| BH [dpt] | 0.687 | 0.890 |
| Sph = −4.0 dpt, add = 3.0 dpt | | |
| y = 15 mm | | |
| x [mm] | −15.0 | 15.0 |
| BH [dpt] | 0.347 | 0.235 |
| y = −35 mm | | |
| x [mm] | −15.0 | 15.0 |
| BH [dpt] | 0.957 | 1.351 |
| Sph = 0.5 dpt, add = 1.0 dpt | | |
| y = 15 mm | | |
| x [mm] | −15.0 | 15.0 |
| BH [dpt] | 0.155 | 0.093 |
| y = −35 mm | | |
| x [mm] | −15.0 | 15.0 |
| BH [dpt] | 0.384 | 0.504 |
| Sph = 0.5 dpt, add = 2.0 dpt | | |
| y = 15 mm | | |
| x [mm] | −15.0 | 15.0 |
| BH [dpt] | 0.326 | 0.248 |
| y = −35 mm | | |
| x [mm] | −15.0 | 15.0 |
| BH [dpt] | 0.750 | 0.931 |

-continued

| Sph = 0.5 dpt, add = 3.0 dpt | | |
|---|---|---|
| y = 15 mm | | |
| x [mm] | −15.0 | 15.0 |
| BH [dpt] | 0.427 | 0.279 |
| y = −35 mm | | |
| x [mm] | −15.0 | 15.0 |
| BH [dpt] | 1.081 | 1.362 |
| Sph = 5.0 dpt, add = 1.0 dpt | | |
| y = 15 mm | | |
| x [mm] | −15.0 | 15.0 |
| BH [dpt] | 0.101 | 0.063 |
| y = −35 mm | | |
| x [mm] | −15.0 | 15.0 |
| BH [dpt] | 0.585 | 0.676 |
| Sph = 5.0 dpt, add = 2.0 dpt | | |
| y = 15 mm | | |
| x [mm] | −15.0 | 15.0 |
| BH [dpt] | 0.286 | 0.218 |
| y = −35 mm | | |
| x [mm] | −15.0 | 15.0 |
| BH [dpt] | 0.981 | 1.197 |
| Sph = 5.0 dpt, add = 3.0 dpt | | |
| y = 15 mm | | |
| x [mm] | −15.0 | 15.0 |
| BH [dpt] | 0.447 | 0.257 |
| y = −35 mm | | |
| x [mm] | −15.0 | 15.0 |
| BH [dpt] | 1.164 | 1.674. |

3. Spectacle lens according to claim 1, wherein an absolute value of a minimum of a first derivative of the astigmatism along the curve is smaller than AG, which is a function of lens parameters x, y, Sph, and add, wherein the function is obtained by interpolating and extrapolating the values provided in the tables below

| Sph = −4.0 dpt, add = 1.0 dpt | | |
|---|---|---|
| y = 15 mm | | |
| x [mm] | −15.0 | 15.0 |
| AG [dpt/mm] | 0.027 | 0.021 |
| y = −35 mm | | |
| x [mm] | −15.0 | 15.0 |
| AG [dpt/mm] | 0.091 | 0.088 |
| Sph = −4.0 dpt, add = 2.0 dpt | | |
| y = 15 mm | | |
| x [mm] | −15.0 | 15.0 |
| AG [dpt/mm] | 0.065 | 0.054 |
| y = −35 mm | | |
| x [mm] | −15.0 | 15.0 |
| AG [dpt/mm] | 0.168 | 0.179 |
| Sph = −4.0 dpt, add = 3.0 dpt | | |
| y = 15 mm | | |
| x [mm] | −15.0 | 15.0 |
| AG [dpt/mm] | 0.077 | 0.060 |
| y = −35 mm | | |
| x [mm] | −15.0 | 15.0 |
| AG [dpt/mm] | 0.276 | 0.284 |
| Sph = 0.5 dpt, add = 1.0 dpt | | |
| y = 15 mm | | |
| x [mm] | −15.0 | 15.0 |
| AG [dpt/mm] | 0.027 | 0.021 |
| y = −35 mm | | |
| x [mm] | −15.0 | 15.0 |
| AG [dpt/mm] | 0.105 | 0.105 |

-continued

| Sph = 0.5 dpt, add = 2.0 dpt | | |
|---|---|---|
| y = 15 mm | | |
| x [mm] | −15.0 | 15.0 |
| AG [dpt/mm] | 0.060 | 0.049 |
| y = −35 mm | | |
| x [mm] | −15.0 | 15.0 |
| AG [dpt/mm] | 0.168 | 0.151 |
| Sph = 0.5 dpt, add = 3.0 dpt | | |
| y = 15 mm | | |
| x [mm] | −15.0 | 15.0 |
| AG [dpt /mm] | 0.079 | 0.053 |
| y = −35 mm | | |
| x [mm] | −15.0 | 15.0 |
| AG [dpt/mm] | 0.285 | 0.256 |
| Sph = 5.0 dpt, add = 1.0 dpt | | |
| y = 15 mm | | |
| x [mm] | −15.0 | 15.0 |
| AG [dpt/mm] | 0.027 | 0.017 |
| y = −35 mm | | |
| x [mm] | −15.0 | 15.0 |
| AG [dpt/mm] | 0.093 | 0.094 |
| Sph = 5.0 dpt, add = 2.0 dpt | | |
| y = 15 mm | | |
| x [mm] | −15.0 | 15.0 |
| AG [dpt/mm] | 0.052 | 0.040 |
| y = −35 mm | | |
| x [mm] | −15.0 | 15.0 |
| AG [dpt/mm] | 0.183 | 0.155 |
| Sph = 5.0 dpt, add = 3.0 dpt | | |
| y = 15 mm | | |
| x [mm] | −15.0 | 15.0 |
| AG [dpt/mm] | 0.075 | 0.043 |
| y = −35 mm | | |
| x [mm] | −15.0 | 15.0 |
| AG [dpt/mm] | 0.284 | 0.252. |

4. Spectacle lens according to claim 1, wherein an absolute value of a maximum of a first derivative of the mean power along the curve is smaller than BG, which is a function of lens parameters x, y, Sph, and add, wherein the function is obtained by interpolating and extrapolating the values provided in the tables below

| Sph = −4.0 dpt, add = 1.0 dpt | | |
|---|---|---|
| y = 15 mm | | |
| x [mm] | −15.0 | 15.0 |
| BG [dpt/mm] | 0.021 | 0.014 |
| y = −35 mm | | |
| x [mm] | −15.0 | 15.0 |
| BG [dpt/mm] | 0.066 | 0.065 |
| Sph = −4.0 dpt, add = 2.0 dpt | | |
| y = 15 mm | | |
| x [mm] | −15.0 | 15.0 |
| BG [dpt/mm] | 0.037 | 0.029 |
| y = −35 mm | | |
| x [mm] | −15.0 | 15.0 |
| BG [dpt/mm] | 0.129 | 0.153 |
| Sph = −4.0 dpt, add = 3.0 dpt | | |
| y = 15 mm | | |
| x [mm] | −15.0 | 15.0 |
| BG [dpt/mm] | 0.051 | 0.032 |
| y = −35 mm | | |
| x [mm] | −15.0 | 15.0 |
| BG [dpt/mm] | 0.187 | 0.223 |
| Sph = 0.5 dpt, add = 1.0 dpt | | |
| y = 15 mm | | |
| x [mm] | −15.0 | 15.0 |
| BG [dpt/mm] | 0.021 | 0.016 |
| y = −35 mm | | |
| x [mm] | −15.0 | 15.0 |
| BG [dpt/mm] | 0.072 | 0.073 |
| Sph = 0.5 dpt, add = 2.0 dpt | | |
| y = 15 mm | | |
| x [mm] | −15.0 | 15.0 |
| BG [dpt/mm] | 0.042 | 0.034 |
| y = −35 mm | | |
| x [mm] | −15.0 | 15.0 |
| BG [dpt/mm] | 0.137 | 0.131 |
| Sph = 0.5 dpt, add = 3.0 dpt | | |
| y = 15 mm | | |
| x [mm] | −15.0 | 15.0 |
| BG [dpt/mm] | 0.058 | 0.036 |
| y = −35 mm | | |
| x [mm] | −15.0 | 15.0 |
| BG [dpt/mm] | 0.208 | 0.177 |
| Sph = 5.0 dpt, add = 1.0 dpt | | |
| y = 15 mm | | |
| x [mm] | −15.0 | 15.0 |
| BG [dpt/mm] | 0.012 | 0.008 |
| y = −35 mm | | |
| x [mm] | −15.0 | 15.0 |
| BG [dpt/mm] | 0.085 | 0.084 |
| Sph = 5.0 dpt, add = 2.0 dpt | | |
| y = 15 mm | | |
| x [mm] | −15.0 | 15.0 |
| BG [dpt/mm] | 0.034 | 0.025 |
| y = −35 mm | | |
| x [mm] | −15.0 | 15.0 |
| BG [dpt/mm] | 0.176 | 0.154 |
| Sph = 5.0 dpt, add = 3.0 dpt | | |
| y = 15 mm | | |
| x [mm] | −15.0 | 15.0 |
| BG [dpt/mm] | 0.052 | 0.027 |
| y = −35 mm | | |
| x [mm] | −15.0 | 15.0 |
| BG [dpt/mm] | 0.228 | 0.194. |

5. Spectacle lens according to claim 2, wherein an absolute value of a maximum of a first derivative of the astigmatism along the curve is smaller than AG, which is a function of lens parameters x, y, Sph, and add, wherein the function is obtained by interpolating and extrapolating the values provided in the tables below

| Sph = −4.0 dpt, add = 1.0 dpt | | |
|---|---|---|
| y = 15 mm | | |
| x [mm] | −15.0 | 15.0 |
| AG [dpt/mm] | 0.027 | 0.021 |
| y = −35 mm | | |
| x [mm] | −15.0 | 15.0 |
| AG [dpt/mm] | 0.091 | 0.088 |
| Sph = −4.0 dpt, add = 2.0 dpt | | |
| y = 15 mm | | |
| x [mm] | −15.0 | 15.0 |
| AG [dpt/mm] | 0.065 | 0.054 |
| y = −35 mm | | |
| x [mm] | −15.0 | 15.0 |
| AG [dpt/mm] | 0.168 | 0.179 |

-continued

| Sph = −4.0 dpt, add = 3.0 dpt | | |
|---|---|---|
| y = 15 mm | | |
| x [mm] | −15.0 | 15.0 |
| AG [dpt/mm] | 0.077 | 0.060 |
| y = −35 mm | | |
| x [mm] | −15.0 | 15.0 |
| AG [dpt/mm] | 0.276 | 0.284 |
| Sph = 0.5 dpt, add = 1.0 dpt | | |
| y = 15 mm | | |
| x [mm] | −15.0 | 15.0 |
| AG [dpt/mm] | 0.027 | 0.021 |
| y = −35 mm | | |
| x [mm] | −15.0 | 15.0 |
| AG [dpt/mm] | 0.105 | 0.105 |
| Sph = 0.5 dpt, add = 2.0 dpt | | |
| y = 15 mm | | |
| x [mm] | −15.0 | 15.0 |
| AG [dpt/mm] | 0.060 | 0.049 |
| y = −35 mm | | |
| x [mm] | −15.0 | 15.0 |
| AG [dpt/mm] | 0.168 | 0.151 |
| Sph = 0.5 dpt, add = 3.0 dpt | | |
| y = 15 mm | | |
| x [mm] | −15.0 | 15.0 |
| AG [dpt /mm] | 0.079 | 0.053 |
| y = −35 mm | | |
| x [mm] | −15.0 | 15.0 |
| AG [dpt/mm] | 0.285 | 0.256 |
| Sph = 5.0 dpt, add = 1.0 dpt | | |
| y = 15 mm | | |
| x [mm] | −15.0 | 15.0 |
| AG [dpt/mm] | 0.027 | 0.017 |
| y = −35 mm | | |
| x [mm] | −15.0 | 15.0 |
| AG [dpt/mm] | 0.093 | 0.094 |
| Sph = 5.0 dpt, add = 2.0 dpt | | |
| y = 15 mm | | |
| x [mm] | −15.0 | 15.0 |
| AG [dpt/mm] | 0.052 | 0.040 |
| y = −35 mm | | |
| x [mm] | −15.0 | 15.0 |
| AG [dpt/mm] | 0.183 | 0.155 |
| Sph = 5.0 dpt, add = 3.0 dpt | | |
| y = 15 mm | | |
| x [mm] | −15.0 | 15.0 |
| AG [dpt/mm] | 0.075 | 0.043 |
| y = −35 mm | | |
| x [mm] | −15.0 | 15.0 |
| AG [dpt/mm] | 0.284 | 0.252. |

6. Spectacle lens according to claim 5, wherein an absolute value of a maximum of a first derivative of the mean power along the curve is smaller than BG, which is a function of lens parameters x, y, Sph, and add, wherein the function is obtained by interpolating and extrapolating the values provided in the tables below

| Sph = −4.0 dpt, add = 1.0 dpt | | |
|---|---|---|
| y = 15 mm | | |
| x [mm] | −15.0 | 15.0 |
| BG [dpt/mm] | 0.021 | 0.014 |
| y = −35 mm | | |
| x [mm] | −15.0 | 15.0 |
| BG [dpt/mm] | 0.066 | 0.065 |

-continued

| Sph = −4.0 dpt, add = 2.0 dpt | | |
|---|---|---|
| y = 15 mm | | |
| x [mm] | −15.0 | 15.0 |
| BG [dpt/mm] | 0.037 | 0.029 |
| y = −35 mm | | |
| x [mm] | −15.0 | 15.0 |
| BG [dpt/mm] | 0.129 | 0.153 |
| Sph = −4.0 dpt, add = 3.0 dpt | | |
| y = 15 mm | | |
| x [mm] | −15.0 | 15.0 |
| BG [dpt/mm] | 0.051 | 0.032 |
| y = −35 mm | | |
| x [mm] | −15.0 | 15.0 |
| BG [dpt/mm] | 0.187 | 0.223 |
| Sph = 0.5 dpt, add = 1.0 dpt | | |
| y = 15 mm | | |
| x [mm] | −15.0 | 15.0 |
| BG [dpt/mm] | 0.021 | 0.016 |
| y = −35 mm | | |
| x [mm] | −15.0 | 15.0 |
| BG [dpt/mm] | 0.072 | 0.073 |
| Sph = 0.5 dpt, add = 2.0 dpt | | |
| y = 15 mm | | |
| x [mm] | −15.0 | 15.0 |
| BG [dpt/mm] | 0.042 | 0.034 |
| y = −35 mm | | |
| x [mm] | −15.0 | 15.0 |
| BG [dpt/mm] | 0.137 | 0.131 |
| Sph = 0.5 dpt, add = 3.0 dpt | | |
| y = 15 mm | | |
| x [mm] | −15.0 | 15.0 |
| BG [dpt/mm] | 0.058 | 0.036 |
| y = −35 mm | | |
| x [mm] | −15.0 | 15.0 |
| BG [dpt/mm] | 0.208 | 0.177 |
| Sph = 5.0 dpt, add = 1.0 dpt | | |
| y = 15 mm | | |
| x [mm] | −15.0 | 15.0 |
| BG [dpt/mm] | 0.012 | 0.008 |
| y = −35 mm | | |
| x [mm] | −15.0 | 15.0 |
| BG [dpt/mm] | 0.085 | 0.084 |
| Sph = 5.0 dpt, add = 2.0 dpt | | |
| y = 15 mm | | |
| x [mm] | −15.0 | 15.0 |
| BG [dpt/mm] | 0.034 | 0.025 |
| y = −35 mm | | |
| x [mm] | −15.0 | 15.0 |
| BG [dpt/mm] | 0.176 | 0.154 |
| Sph = 5.0 dpt, add = 3.0 dpt | | |
| y = 15 mm | | |
| x [mm] | −15.0 | 15.0 |
| BG [dpt/mm] | 0.052 | 0.027 |
| y = −35 mm | | |
| x [mm] | −15.0 | 15.0 |
| BG [dpt/mm] | 0.228 | 0.194. |

7. Spectacle lens according to claim 3, wherein an absolute value of a maximum of a first derivative of the mean power along the curve is smaller than BG, which is a function of lens parameters x, y, Sph, and add, wherein the function is obtained by interpolating and extrapolating the values provided in the tables below

| Sph = −4.0 dpt, add = 1.0 dpt | | |
|---|---|---|
| y = 15 mm | | |
| x [mm] | −15.0 | 15.0 |
| BG [dpt/mm] | 0.021 | 0.014 |
| y = −35 mm | | |
| x [mm] | −15.0 | 15.0 |
| BG [dpt/mm] | 0.066 | 0.065 |
| Sph = −4.0 dpt, add = 2.0 dpt | | |
| y = 15 mm | | |
| x [mm] | −15.0 | 15.0 |
| BG [dpt/mm] | 0.037 | 0.029 |
| y = −35 mm | | |
| x [mm] | −15.0 | 15.0 |
| BG [dpt/mm] | 0.129 | 0.153 |
| Sph = −4.0 dpt, add = 3.0 dpt | | |
| y = 15 mm | | |
| x [mm] | −15.0 | 15.0 |
| BG [dpt/mm] | 0.051 | 0.032 |
| y = −35 mm | | |
| x [mm] | −15.0 | 15.0 |
| BG [dpt/mm] | 0.187 | 0.223 |
| Sph = 0.5 dpt, add = 1.0 dpt | | |
| y = 15 mm | | |
| x [mm] | −15.0 | 15.0 |
| BG [dpt/mm] | 0.021 | 0.016 |
| y = −35 mm | | |
| x [mm] | −15.0 | 15.0 |
| BG [dpt/mm] | 0.072 | 0.073 |
| Sph = 0.5 dpt, add = 2.0 dpt | | |
| y = 15 mm | | |
| x [mm] | −15.0 | 15.0 |
| BG [dpt/mm] | 0.042 | 0.034 |
| y = −35 mm | | |

-continued

| | | |
|---|---|---|
| x [mm] | −15.0 | 15.0 |
| BG [dpt/mm] | 0.137 | 0.131 |
| Sph = 0.5 dpt, add = 3.0 dpt | | |
| y = 15 mm | | |
| x [mm] | −15.0 | 15.0 |
| BG [dpt/mm] | 0.058 | 0.036 |
| y = −35 mm | | |
| x [mm] | −15.0 | 15.0 |
| BG [dpt/mm] | 0.208 | 0.177 |
| Sph = 5.0 dpt, add = 1.0 dpt | | |
| y = 15 mm | | |
| x [mm] | −15.0 | 15.0 |
| BG [dpt/mm] | 0.012 | 0.008 |
| y = −35 mm | | |
| x [mm] | −15.0 | 15.0 |
| BG [dpt/mm] | 0.085 | 0.084 |
| Sph = 5.0 dpt, add = 2.0 dpt | | |
| y = 15 mm | | |
| x [mm] | −15.0 | 15.0 |
| BG [dpt/mm] | 0.034 | 0.025 |
| y = −35 mm | | |
| x [mm] | −15.0 | 15.0 |
| BG [dpt/mm] | 0.176 | 0.154 |
| Sph = 5.0 dpt, add = 3.0 dpt | | |
| y = 15 mm | | |
| x [mm] | −15.0 | 15.0 |
| BG [dpt/mm] | 0.052 | 0.027 |
| y = −35 mm | | |
| x [mm] | −15.0 | 15.0 |
| BG [dpt/mm] | 0.228 | 0.194. |

* * * * *